Oct. 30, 1934.  W. E. HIGGINBOTTOM  1,979,157
BAG SEALING DEVICE
Filed Nov. 8, 1932    2 Sheets-Sheet 1
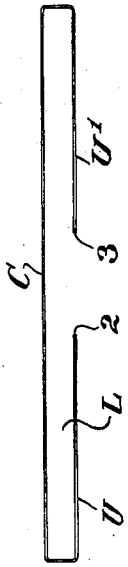
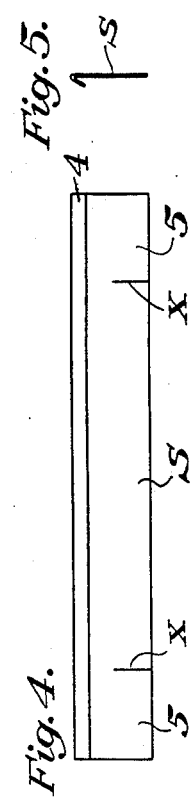
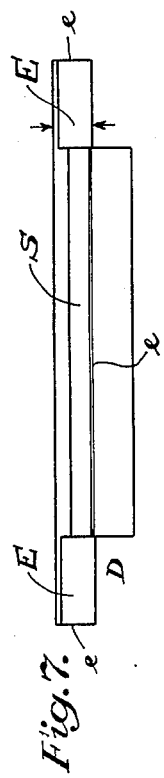
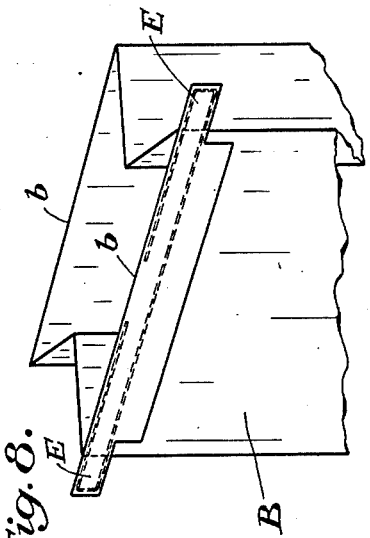
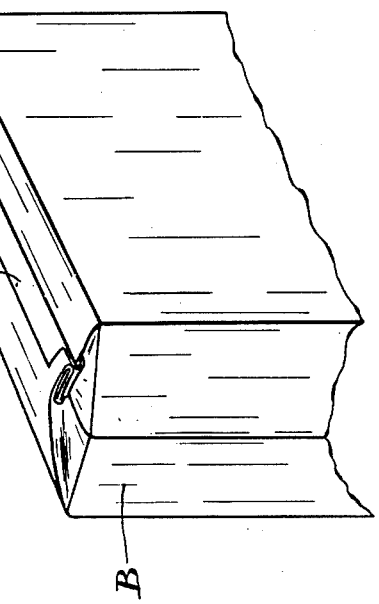
INVENTOR.
William E. Higginbottom
BY
Cornelius D. Ehret
his ATTORNEY.

Oct. 30, 1934. W. E. HIGGINBOTTOM 1,979,157
BAG SEALING DEVICE
Filed Nov. 8, 1932 2 Sheets-Sheet 2
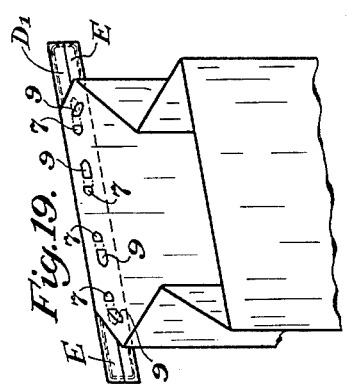
INVENTOR.
William E. Higginbottom,
BY Cornelius D. Ehret
his ATTORNEY.

Patented Oct. 30, 1934

1,979,157

UNITED STATES PATENT OFFICE 1,979,157

BAG SEALING DEVICE

William E. Higginbottom, Haverford Township, Montgomery County, Pa., assignor to Benjamin C. Betner Company, Devon, Pa., a corporation of Delaware Application November 8, 1932, Serial No. 641,718

16 Claims. (Cl. 229—65)

My invention relates to bag sealing or fastening devices which are attached to or united with a bag and permit ready opening and closing of the package and insure effective sealing when closed.

My invention resides in a fastening device made of a narrow loop of small wire, with the ends of the wire preferably spaced, or separated, and a strip of paper, or equivalent, applied to stiffen the loop, to provide for its attachment to a bag or the like, and to maintain the loop in position.

My invention further resides in the features of construction and combination hereinafter described and claimed.

For an understanding of my invention and for illustration of preferred forms thereof reference is to be had to the accompanying drawings in which:

Figs. 1 and 2 illustrate steps of forming a loop of wire.

Fig. 3 represents a strip of paper or the like.

Fig. 4 shows the strip of Fig. 3 after folding and cutting operations.

Fig. 5 is an end view of Fig. 4.

Figs. 6 and 7 illustrate successive steps of forming a bag-fastening device from the loop of Fig. 2 and the paper strip of Fig. 4.

Fig. 8 in perspective illustrates the fastening device of Fig. 7 attached to a bag.

Fig. 9 in perspective, illustrates one manner in which the fastening device may be used for holding the bag closed.

Figs. 10 to 15 inclusive illustrate the elements and assembly of a modified form of the invention.

Fig. 16 in perspective illustrates the fastening device of Fig. 15 applied to a bag.

Fig. 17 in perspective illustrates one manner in which the device may hold a bag closed.

Figs. 18 and 19 illustrate attachment of the device to the bag without use of adhesive.

Figs. 20 and 21 are detail views on enlarged scale of the fastening arrangement of Figs. 18 and 19.

Referring to the drawings, the wire 1 of suitable size and material, for example, annealed steel wire of about #26 gauge, is bent, as shown in Fig. 2, to form a narrow loop L which is suitably longer than the bag to which the completed device is to be attached. The ends 2, 3, of the wire are not attached to each other, and in fact, as shown, there may be substantial spacing between them. The loop L is, therefore, in effect, comprised of two U-shaped elements U and U1 disposed so that the closed ends of the U's are remote from each other and with the legs of each element directed towards the corresponding legs of the other element, with the central portion c joining one pair of legs.

The other element of the fastening device is a strip S, Fig. 3, of suitable material as paper, whose length is approximately the same as the length of the loop 1, and preferably slightly greater, and whose width is approximately twice the width of the loop L. It will be understood, however, that the limitations as to size of the paper are not strict but may be departed therefrom to greater or less extent although I prefer substantially the dimensions given as affording neat appearance and strength, of the completed device with economy of paper, for it will be understood that when thousands of these devices are made that the saving effected by making the size of the strips of the minimum consistent with strength, appearance, etc., is considerable.

The upper edge of the strip is folded to provide a long narrow flap 4, which as shown in Fig. 6 is turned back to embrace one long side of the loop, preferably the open side. The other long edge of the strip S is notched or slit as indicated at x, x, to provide the flaps 5, 5 which are turned upward to overlie the ends U, U1, as shown in Fig. 7 to form the gripping elements E of the device. The flaps 4, 5, 5, adhesively engage the surface of the strip S within the area defined by the loop. This engagement performs several functions; it definitely holds the loop in place, preventing it from slipping endwise; it maintains the split or disconnected portions of the upper side of the loop in aligned relation; and it stiffens the ends E, E of the device. In other words, the ends E by virtue of the adhesive engagement between the flaps and the surface of the strip within the loop are stiff and resist any tendency for the ends U, U1 to collapse even though considerable pressure is applied.

Preferably, as above stated, the strip is somewhat longer than the loop L so that when the flaps 4, 5, 5 are turned into adhesive engagement with each other and with the surface of the strip engaged by the loop, the edges e, e of the device are closed, concealing the wire, and further serving to prevent any tendency for the loop L to slip lengthwise.

The completed device D, Fig. 7, is preferably attached to the bag as shown in Fig. 8, with its smooth side outward, and with the top edge of the bag substantially flush with the top edge of the strip. The bag itself by its adhesive engagement with the strip above and below the lower side 1 of the loop further serves to stiffen the fastening device and to definitely maintain the desired spacing between the upper and lower sides of the loop.

To close the bag B, the top edges b, b thereof may be brought together and then rolled, as shown in Fig. 9. The ends E, E projecting beyond the sides of the bag are then folded downwardly and inwardly. Alternatively, the rolled top of the bag may be moved to vertical position, Fig. 17, and the ends E, E of the device turned backwardly to prevent unrolling.

The bag may be repeatedly opened and closed without impairing in any way the clamping efficiency of the device. Since only two thin wires need be bent, the ends are much more readily folded than if the device were made of a strip of metal, and yet since the bend can be made so sharp the bag is held just as securely as though the much more expensive metal strip were used. Moreover, by using a loop as shown there are no sharp edges tending to cut the paper strips or to injure the hand of one opening or closing the bag. As the fastening device is very simple and inexpensive its field of use is extensive and comprehends uses where the cost of other bag fastening devices would make the expense of their use prohibitively high.

The cost of materials can be further reduced by further increasing the space between the ends 2, 3 of the wire but the spacing should not be increased to such extent that there will be a tendency for the ends of the wire to puncture the paper when the flaps E, E of the device are bent in opening or closing of the bag.

The covering of the ends 2, 3 of the wire by flap 4 is to be preferred for then the devices as such may be handled in batches without danger of injuring one another but particularly if the devices as made are substantially at once attached to the bags, the loop L may be reversed in position with the open side at the bottom for the bag itself when adhesively secured to the strip S serves to maintain the proper position of the halves of the lower side of the loop.

The modification shown in Fig. 15 has all the advantages of the modification previously described and in addition is even simpler and requires less material; it is particularly to be preferred when the fastening devices, unattached, are to be subject to handling or shipping. It consists of the two elements, a loop L of wire (Fig. 10) and a strip of paper $S_1$, (Fig. 11), which may be somewhat narrower than the strip S of Fig. 3, other things remaining the same.

One long edge of the strip $S_1$ is folded to form a flap 4 embracing one long side of loop L. The opposite edge, however, is not slitted as in Fig. 4, but in its entirety is folded to form flap 6 extending the length of the strip and which embraces the other long side of loop L. Preferably, the widths of the flaps 4 and 6 are such that their edges abut or slightly overlap.

In any event, the flaps 4 and 6 adhesively engage the strip $S_1$ within the loop stiffening it against collapse and maintaining it in proper position. The strip $S_1$ is preferably slightly longer than the loop so that the edges e, e of the device $D_1$ are closed, concealing the wire, and further serving to prevent change in position of the loop.

The completed device D is attached to a bag, as by adhesive, preferably with the flaps 4 and 6 applied to the bag which thus further serves to hold the flaps 4 and 6 in position.

Particularly when closing devices are to be attached as part of or during the process of filling and closing the bags, the use of adhesive is undesirable, because, among other things, the time required for setting of the adhesive unduly delays the process. As shown in Figs. 18 and 19, the device $D_1$ may be attached without use of adhesive. For cheapness and simplicity, the fastening is provided by the materials of the bag and of the closing device themselves; for example, the tongues 7 struck from the bag B and from the strip S between the loop L, are turned outwardly and then through the slits 8 into the interior of the bag, as more clearly shown in Figs. 20 and 21. The holes 9 left by punching out of the tongues are of course concealed when the top of the bag is rolled and closed by device D or $D_1$. These operations of punching, slitting and insertion of the tongues can be performed in rapid succession and in any event, in a period which is short, or comparable with the other steps of filling and closing the bag.

The tongues 7 hold the device firmly in place and substantially permanently so insofar as ordinary handling, and opening and closing of the bag are concerned.

Preferably, the outer tongues are punched some distance in from the vertical edges of the side 10 of the bag so that when the top of the bag is opened as for filling the top or horizontal edge is quite free to bow as shown in Fig. 19.

While I have illustrated certain preferred modifications in illustration of my invention, it is to be understood that the invention is not limited thereto but is coextensive in scope with the appended claims.

What I claim is:

1. Means for closing a bag comprising an open loop of wire, and a strip of paper having a turned-over portion embracing the open ends of the loop and adhesively attached to the strip within the loop.

2. Means for closing a bag comprising an open loop of wire, and a strip of paper having one edge turned over the open ends of the loop and adhesively attached to the strip within the loop, and flaps turned back from the opposite edge to overlie the ends of the loop.

3. Means for closing a bag comprising a loop of wire, and a strip of paper approximately twice the width thereof, having one long edge turned over one long side of the loop and flaps turned back from the opposite edge of the strip to overlie the ends of the loop.

4. Means for closing a bag comprising a loop of wire, and a strip of paper slightly longer than said loop having one long edge turned over one long side of the loop and flaps turned back from the opposite edge of the strip to overlie the ends of the loop, the turned-over portions adhesively engaging the surface of the strip within the loop and beyond the ends of the loop.

5. A bag and attached closing means comprising an open loop of wire substantially longer than the width of the bag, a strip of paper having its upper edge turned over the open ends of the wire and into adhesive engagement with the surface of the strip within the loop, and provided with flaps turned back from the lower edge of the strip and overlying the ends of the loop, the upper end of one side of the bag adhesively engaging the strip between the flaps above and below the lower side of the loop to secure it.

6. The method of forming a bag fastening device which comprises bending wire to form an open loop, disposing the loop upon a strip of paper adjacent an edge thereof, turning said edge of the paper over the spaced ends of the wire and into adhesive engagement with the surface of the strip within the loop, slitting the opposite edge of the strip to form flaps, and folding the flaps to overlie the ends of the loop.

7. The method of forming and attaching a bag fastening device which comprises bending wire to form an open loop substantially longer than the width of the bag, disposing the loop upon a strip of paper of approximately the same length with the ends of the wire adjacent one edge of the strip, turning said edge of the strip over the ends of the wire into adhesive engagement with the surface of the strip within the loop, slitting the opposite edge of the strip to form flaps, folding the flaps to overlie the ends of the loop, and effecting adhesive engagement between an upper end of the bag and the strip between said flaps and within the loop.

8. A bag-sealing device comprising a narrow loop of wire, and a strip of paper snugly encasing said loop, and having opposite surfaces in adhesive engagement within the loop.

9. A bag-sealing device comprising a narrow loop of wire, and a strip of paper snugly encasing said loop, and having opposite surfaces in adhesive engagement within the loop and beyond the ends of the loop.

10. A bag-sealing device comprising a narrow loop of wire, and a strip of paper having opposite edges folded over opposite sides of the loop throughout its length and into adhesive engagement with the strip surface within the loop.

11. A bag-sealing device comprising a loop of wire and a strip of paper snugly encasing said loop, a bag, and means for securing said device to the bag comprising tongues struck from the bag and from the strip within the loop, and inserted through slits in the bag and in said device.

12. A bag sealing strip comprising U-shaped elements of wire disposed at the ends thereof so that the closed ends of the U's are adapted to project beyond the sides of the bag, and a strip of paper substantially encasing said elements and having its opposite faces attached to each other between the legs of said elements.

13. A bag and attached closing means comprising U-shaped elements of wire disposed so that the distance between the closed ends of the U's is greater than the width of the bag, and a strip of paper for attaching said elements to the bag and encasing them, having its opposite faces attached to each other between the legs of said elements.

14. Means for closing a bag comprising U-shaped elements of wire, the closed ends of the U's being farther apart than the width of the bag to project beyond the sides of the bag, and a sheath of paper encasing said elements having its opposite faces adhesively attached to each other beyond the ends of said elements and substantially throughout the area between the legs of said elements.

15. A bag sealing strip comprising U-shaped elements of wire at the ends of the strip, and a strip of paper snugly encasing said U-shaped elements and having its opposite faces attached to each other between the legs of said elements.

16. A bag sealing device comprising a narrow loop of wire, and a strip of paper snugly encasing the ends of said loop and having its opposite surfaces in adhesive engagement within the loop.

WILLIAM E. HIGGINBOTTOM.